April 3, 1956 R. W. HELWIG 2,740,698
FLUIDIZED SOLIDS APPARATUS
Filed June 30, 1952 3 Sheets-Sheet 1
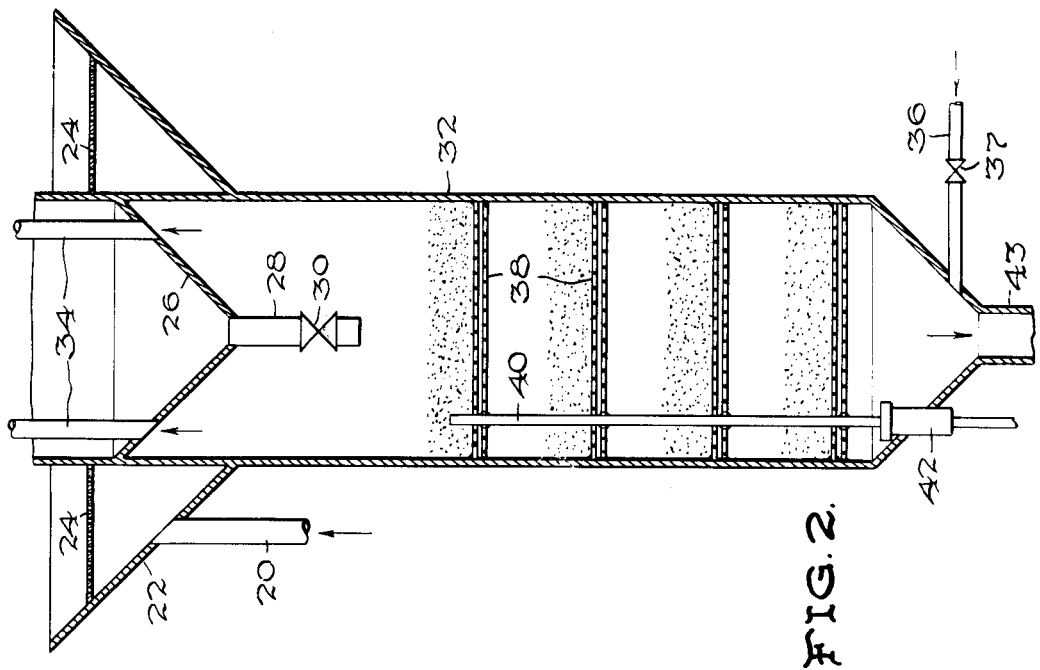
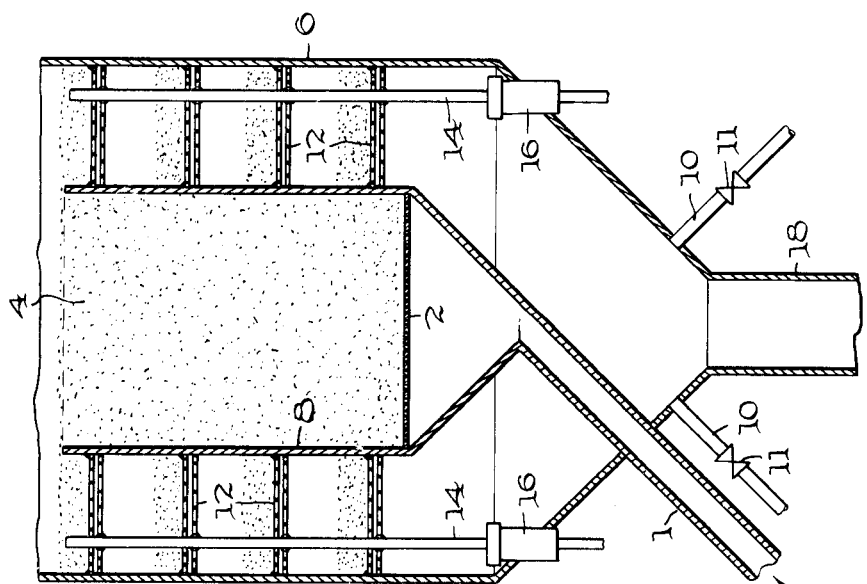
INVENTOR.
RALPH W. HELWIG
BY
HIS ATTORNEY April 3, 1956  R. W. HELWIG  2,740,698
FLUIDIZED SOLIDS APPARATUS
Filed June 30, 1952  3 Sheets-Sheet 2

INVENTOR.
RALPH W. HELWIG
BY
Duane B Cook
HIS ATTORNEY

April 3, 1956 R. W. HELWIG 2,740,698
FLUIDIZED SOLIDS APPARATUS
Filed June 30, 1952 3 Sheets-Sheet 3

INVENTOR.
RALPH W. HELWIG
BY
Arnault Cooke
HIS ATTORNEY

United States Patent Office 2,740,698
Patented Apr. 3, 1956

2,740,698

FLUIDIZED SOLIDS APPARATUS

Ralph W. Helwig, Oakmont, Pa., assignor to Gulf Research & Development Company, Pittsburgh, Pa., a corporation of Delaware Application June 30, 1952, Serial No. 296,400

8 Claims. (Cl. 23—288)

This invention relates to a process and apparatus for the pyrolytic conversion of reactant vapors in a reaction zone containing a dense phase bed of fluidized solid particles, and more particularly to a method and means for obtaining a relatively constant degree of stripping of particles in an operation of the type described, where particles are continuously circulated at varying rates from the reaction zone to a regeneration zone and in the reverse direction.

Systems involving the continuous conversion of reactant vapors in a reaction zone containing fluidized solid particles, the continuous regeneration of said particles in a regeneration zone, and a continuous flow of particles from the conversion or reaction zone to the regenerating zone and back again are well known. Because of fluctuations in the system and/or because of changes in the feed and/or operating conditions, it is important that flexibility in the rate of particle circulation between the aforesaid zones be provided, in order to maintain the desired particle bed level in the respective zones and the desired particle: reactant ratio in the reaction zone.

It is also known to strip the particles after removal from either or both of the aforesaid zones prior to transfer of these particles to the other zone. Stripping of particles removed from the reaction zone is important in order to direct as much as possible of the reaction products and unreacted reactant into the product recovery system and to avoid overloading the regenerator. Stripping of regenerated particles is desired to avoid afterburning and to avoid introduction of regenerating gases into the reaction zone.

Some previously employed stripping operations have provided the desired flexibility in the rate of particle circulation between the zones, but have involved somewhat less than the maximum degree of intercontact of particles and stripping medium. Other systems have provided improved contact between particles and stripping medium, but have also required a sacrifice in the degree of stripping obtained for the sake of flexibility in the rate of circulation of particles from and/or to the respective zones mentioned above.

It is an important object of the invention to provide an improved process and apparatus whereby the foregoing difficulties may be avoided or substantially alleviated. More specifically, the present invention has as an object the provision of a continuous fluidized process and apparatus in which a relatively constant, good degree of stripping is maintained without interfering with the flexibility of the particle circulation rate between the reaction and regenerating zones. It is another object to provide a process and apparatus whereby an improved degree of stripping efficiency is obtained. It is a further object to provide a novel combination of steps and elements which are so interrelated as to provide a unitary, improved result. Other objects will appear hereinafter.

These and other objects are accomplished by the present invention which includes a process and apparatus adapted for the pyrolytic conversion of reactant vapors in a reaction zone containing a dense phase bed of fluidized solid particles. The invention also involves the continuous circulation at varying rates of fluidized solid particles between the reaction zone and a regenerating zone, which also contains a dense phase fluidized bed of fluidized particles. Solid particles are stripped by contact with a stripping medium after removal from at least one of the zones and prior to transfer to the other of said zones. Stripping is carried out by passing fluidized particles downwardly in countercurrent contact with a stripping medium through a series of stripping zones. Each stripping zone contains dense and dilute phase suspensions of solid particles. The stripping zones are connected to each other by a plurality of apertures. The invention includes in combination with the above, method and apparatus for concurrently varying the effective size of the apertures and the rate of introduction of the stripping medium in approximately direct proportion to variations in the rate of particle circulation between said reaction and regenerating zones.

In the accompanying description and drawings certain preferred embodiments of the invention have been shown and described. It is understood that these are by way of illustration only and not to be considered as limiting.

Referring briefly to the attached drawings,

Figures 1 and 2 represent schematically portions of fluidized contacting apparatus embodying the principles of the invention;

Figures 3 to 7, inclusive, represent diagrammatic views of foraminous members containing apertures adapted to connect the stripping zones mentioned above, and arranged in varying positions;

Figure 3:
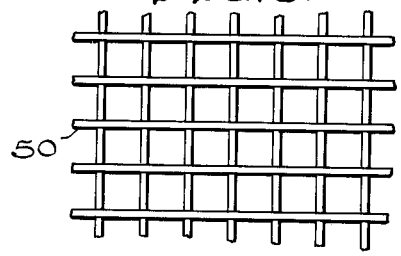

In order that the invention may be more easily understood, a brief explanation of the principles involved is appropriate.

Stripping, as is well known in the art, is accomplished by contacting material to be stripped with an inert, gaseous stripping medium in a quantity sufficiently great that the sum of the partial pressures of the stripping medium and the material to be vaporized by stripping is equal to the pressure of the system. Stripping of fluidized solid particles involves, in adidtion to the vaporization described above, gas washing of the particles to remove entrained gases.

The degree of stripping or vaporization obtained in any given operation involving stripping of fluidized solid particles containing adsorbed, vaporizable materials depends on several factors, including the time of contact between the stripping medium and the material to be stripped, the thoroughness of contact, the quantity of stripping medium, the pressure of the system, and the character of the stripping medium and of the material to be vaporized by the stripping operation. For any given fluidized contacting operation, the most desirable degree of stripping represents a favorable economic balance between such factors.

This being the case, it is, of course, desirable to increase the efficiency of the stripping in so far as this is possible without disturbing the balance mentioned above, and without disturbing operation of the over-all fluidized conversion operation. It is also obviously desirable to avoid, in so far as possible, any reduction below whatever degree of stripping is considered optimum.

To achieve a greater stripping efficiency per unit stripping medium, I have divided the stripping chamber into a number of connected, vertically arranged stripping zones by means of a plurality of foraminous members. These foraminous members, which may comprise screens, gratings, perforated plates, or the like, effect repeated redistribution of the upflowing stripping medium, while at the same time permitting downflow of the particles being stripped. Mass turn-over of particles, channeling of gas flow, formation of large gas bubbles, and poor intercontact of stripping medium and particles are thereby avoided. An increase in stripping efficiency is thus obtained, since as compared with an unobstructed stripping chamber, a less quantity of stripping medium is required to achieve the same degree of stripping; or alternatively, the same amount of stripping medium produces a greater degree of stripping.

The expedient described above, however, is not of itself entirely satisfactory in connection with fluidized conversion procedures involving the continuous circulation of particles at varying rates between the reaction zone and the regeneration zone. In this connection, it will be noted that the effective size of the apertures of the foraminous members is less than the cross-sectional area of the stripping chamber. A restriction of the effective area of the passage open to the stripping medium and the particles being stripped is thereby created.

For any fixed, total effective aperture area and rate of flow of stripping medium, the maximum rate of flow of particles is fixed for a given particulate material. This is disadvantageous, since it interferes with flexibility of control of the rate of circulation of particles between the reaction zone and the regeneration zone. In order to attain high rates of particle circulation, when using foraminous members having apertures of a fixed size, it is necessary to vary the rate of introduction of the stripping medium into the stripping chamber inversely with variations in the rate of particle circulation. Thus, an increase in the rate of particle circulation requires a decrease in the rate of introduction of the stripping medium. The converse is also true, if it is desired to operate at the maximum degree of stripping.

Such operation is disadvantageous, since it is necessary to decrease the quantity of stripping medium at the time that the increased particle circulation requires an increase in the rate of stripping medium to maintain the desired degree of stripping.

According to the present invention, I maintain a substantially constant, optimum degree and efficiency of stripping, while varying the rate of particle circulation through the stripping zone in accordance with variations in the rate of circulation between the reaction and regenerating zones. This is accomplished by concurrently varying the effective size of the apertures through the foraminous members in the stripping chamber so that the rate of introduction of the stripping medium can be varied in approximately direct proportion to variations in the rate of particle circulation between the reaction zone and the regenerating zone. Thus, flexibility in the rate of particle circulation between the reaction zone and the regenerating zone is maintained without a sacrifice in the degree of stripping. The expression "approximately direct proportion" is employed, since it may be desired to depart slightly from a precisely directly proportional variation. For example, when doubling the catalyst flow rate, it may be desired to more than double the rate of introduction of stripping medium to compensate for the reduced residence time of the particles in the stripping zone.

Apparatus for carrying out the process is provided, wherein the stripping chamber is divided into a plurality of vertically arranged stripping compartments by means of a plurality of groups of foraminous members mounted transversely within the stripping chamber. The respective members of each group are positioned relatively closely to one another, while the respective groups are relatively remote from each other. Thus, a relatively high stripping capacity per unit stripping volume is obtained. This high capacity is obtained through the efficient "multiple washing" action of the alternate low and high density beds.

Means are provided for moving at least one foraminous member in each group relative to another in either a vertical or horizontal direction, in order to vary the effective size of the apertures. The horizontal movement may be either linear or rotational. Means are also provided for varying the rate of introduction of the stripping medium into the stripping chamber according to variations in the effective size of the apertures. The variations in the effective size of the apertures and the rate of introduction of stripping medium are approximately directly proportional to and consonant with variations in the rate of particle circulation between the reaction zone and the regenerating zone. By the described operations, a relatively constant degree of stripping is maintained, i. e., the partial pressure of the materials adsorbed on the fluidized solid particles is kept about the same, throughout the operation, despite changes in the rate of particle flow through the stripping chamber.

The stripping procedure described is carried out in the normal order relative to the other steps of the fluidized operation, i. e., stripping of the particles is effected after removal of said particles from a vessel or zone and prior to transfer thereof to the other vessel or zone of the combination.

Numerous choices are possible with respect to the structure and arrangement of the foraminous members. The groups thereof may be arranged in pairs or groups of larger number as desired. The size of the apertures, the number of foraminous members and the degree of movement of the movable members may be selected so that the stripper may operate over any range from a lower limit of 0 to an upper limit of nearly 100 per cent of the theoretical throughput of particles. For most procedures, the factors mentioned would be chosen for operation at some intermediate range of particle throughput, such as, for example, 30 to 70 per cent of the theoretical.

The improved stripping operation also cooperates with the fluidized contacting procedure as a whole. In this connection, as the rate of particle circulation between the reaction zone and the regeneration zone is increased by a slide valve or equivalent means, a concurrent increase in the size of the apertures and the rate of introduction of stripping gas is effected. Because of the increased size of the apertures through which the particles pass, the total quantity of particles available for circulation to the other zone is increased. Because of the concurrent increase in the rate of introduction of the stripping medium, the degree of stripping remains relatively constant. When the rate of particle circulation from vessel to vessel is decreased by the means controlling the same, the operation of the stripper is the reverse of that described above.

As a result of the repeated redistribution of the stripping medium by the plurality of foraminous members, a high degree of stripping efficiency is produced. Because of the repeated redistribution of the stripping medium and elimination of mass turnover, a high stripping capacity per unit stripping volume is provided.

Keeping the foregoing discussion in mind, more particular reference to the drawings will be had. In the description of the operation of Figures 1 and 2, the vessels shown will be referred to as a reactor for simplicity, although the improved stripping of the present invention may be utilized for particles removed from either a reactor or a regenerator. The invention is considered particularly desirable in association with a reactor in view of the relatively greater importance of obtaining a high degree and a high efficiency of stripping of particles removed from a reaction zone. Also, for simplicity of explanation, the drawings will be described in connection with a specific reaction for which the invention is suitable, i. e., fluidized catalytic cracking of petroleum hydrocarbon oils.

Referring now to Figure 1 in detail, a suspension of fluidized cracking catalyst and hydrocarbon oil vapors is introduced into the system by way of line 1. This feed passes through distributor plate 2 into the lower portion of the fluidized catalytic bed 4, which portion is bounded by cylindrical member 8. An annular stripping zone is formed in the space between reactor shell 6 and cylindrical member 8 through which the fouled catalyst particles flow downwardly.

An inert stripping gas, e. g., steam, is introduced into the system by way of lines 10. The stripping gas passes upwardly through pairs of foraminous members 12 in countercurrent contact with downflowing catalyst and ultimately into the reaction zone proper. Dense and dilute suspensions of catalyst are maintained within each compartment of the stripping zone immediately above the pairs of foraminous members. Thus, fouled catalyst particles from the reaction zone pass alternately through dilute and dense phase suspensions, thereby obtaining the desired thorough contact with stripping gas. Stripped catalyst passes out of the annular stripping zone into standpipe 18, where a head of catalyst particles is maintained for circulation (at a rate controlled by a slide valve, not shown) to the regenerator.

In the modification shown in Figure 1 the movable foraminous members are adapted to be moved vertically relative to the fixed members. Accordingly, the apertures of the movable members are offset or out of register with the apertures of the fixed members of the respective pairs. Thus, a slight vertical movement of each movable member (either the upper or lower member of each pair) operates to vary the effective size of the apertures through the pairs of foraminous members.

Movement of the movable foraminous members of Figure 1 is by vertical movement of shafts 14 by means not shown. Shafts 14 pass through the pairs of foraminous members 12 and are attached to the lower, movable members of each pair. Elements 16 represent shaft seals positioned at the openings in the lower surface of vessel 6 and surrounding shafts 14. These seals are adapted to prevent leakage of catalyst or gases from the vessel.

Variation in the rate of introduction of stripping gas is achieved by regulation of valves 11. Variation of the effective size of the apertures and the rate of introduction of stripping gas are effected concurrently with and approximately in direct proportion to variations in the rate of particle circulation as controlled by a slide valve not shown.

Figure 2 represents a fragmentary, sectional view of a different type of fluidized catalytic apparatus and stripper embodying the principles of the invention. In operation, cracking catalyst and vaporized oil feed, preheated by means not shown, are introduced into the system by way of line 20. The feed is distributed equally over the reaction zone by means of distributor 24. Fouled catalyst particles containing adsorbed materials flow downwardly through catalyst collector 26, through conduit 28, through valve 30 and into stripping chamber 32. Stripping gas is introduced into the base of the stripper 32 by means of line 36 at a rate controlled by valve 37. Stripping gas passes upwardly through the pairs of foraminous members 38, through the alternate dense and dilute phase suspensions of catalyst above the respective pairs of foraminous members, and out of stripping chamber 32 by way of lines 34. Alternatively, if introduction of stripping gases into the reaction zone is not harmful to the catalyst, elements 26, 28, 30 and 34 may be omitted.

In such instances, the uppermost pair of foraminous members may be positioned higher in the stripping chamber 32; for example, in the vicinity of distributor grating 24.

Stripped catalyst particles pass downwardly through alternate dilute and dense phase suspensions of catalyst, through the foraminous members 38, into standpipe 43, where the head of catalyst particles is maintained. Stripped fluidized particles are circulated from this standpipe to a fluidized catalytic regenerator, not shown, at a rate controlled by a slide valve, not shown. Vertical movement of the foraminous members relative to each other is obtained by operation of shaft 40. The operation of elements 38, 40, 42 and 37 is as that described for corresponding elements 12, 14, 16 and 11, described in connection with Figure 1.

Figure 3 represents a fragmentary plan view of a pair of identically foraminated gratings in superimposed position, with the apertures through each grating being in register with one another. Numeral 50 indicates the upper grating of the pair.

Figure 4:
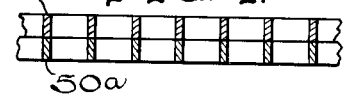

Figure 4 represents sectional view in elevation of the gratings of Figure 3. Numeral 50 again refers to the upper grating while numeral 50a indicates the lower member of the pair.

Figure 5:
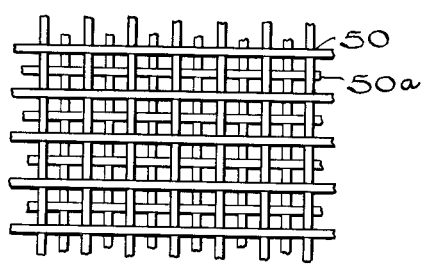
Figure 6:
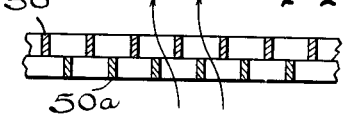
Figure 7:
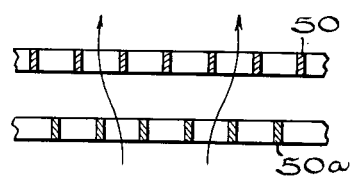

A slight horizontal movement of one of the gratings causes a substantial reduction in the effective area of the passageways through the members, as illustrated in Figures 5 and 6. Alternatively, where the movable grating is moved in a vertical direction, the closed position is as represented in Figures 5 and 6 and the open position is as represented in Figure 7. Thus, where the foraminous members are adapted to be moved horizontally relative to each other, the members remain contiguous to one another. Where the members are adapted to be moved vertically relative to each other, the apertures of the member are out of register in the closed or contiguous position and may be in or out of register in the open position.

Figure 8:
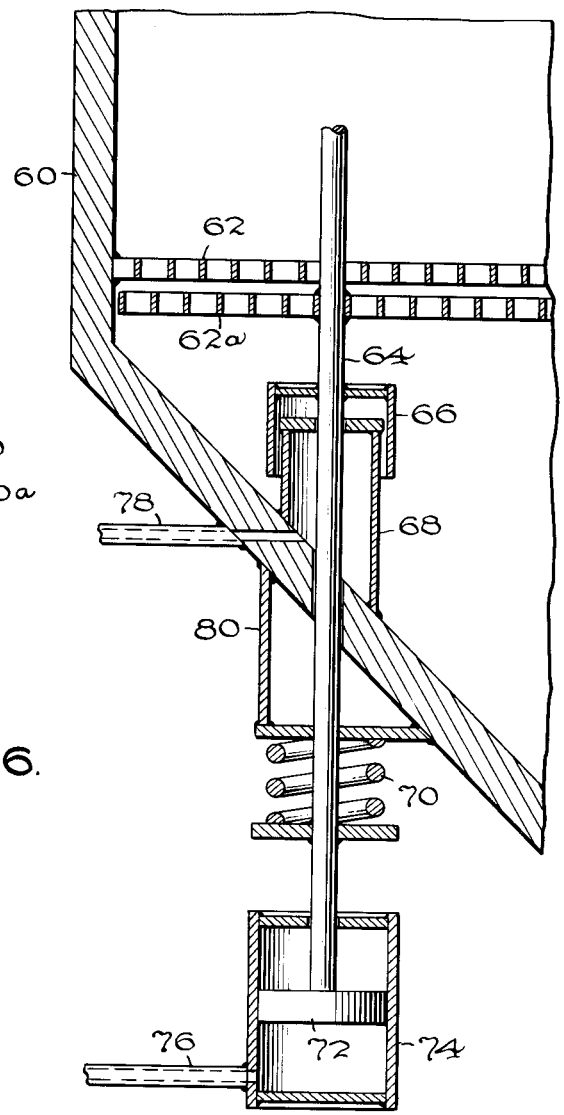
Figures 8 and 9 are diagrammatic, fragmentary views, in vertical section, showing two specific embodiments of means for achieving relative movement of the foraminous members and variations in the effective size of the apertures therethrough.

Figure 8 denotes a fragmentary view in vertical section of a portion of the stripping means employed in Figures 1 or 2, showing the details of suitable means for achieving relative movement of the foraminous members or gratings. In this figure numeral 60 denotes the vessel shell. Numeral 62 refers to a fixedly mounted grating and 62a refers to a movable grating. Number 64 refers to the vertical shaft extending upwardly through the stripping zone to which is attached the movable member 62a of each pair of gratings.

Numeral 66 denotes a hollow, cylindrical catalyst seal attached to shaft 64 and fitting concentrically about smaller cylindrical member 68 which is attached to the lower surface of vessel 60.

In operation, introduction of gas or hydraulic fluid under pressure through line 76 into pressure cylinder 74 forces piston 72, shaft 64 and attached movable gratings 62a upwardly against the compression of valve spring 70. An inert purging gas is introduced through line 78 and into chamber 68 under a pressure sufficient to maintain a positive flow thereof into vessel 60, thereby preventing leakage of catalyst or gases from vessel 60. Chamber 80 is provided to maintain the pressure of the purged gas introduced into chamber 68. The lower surface of chamber 80 also acts as a support for valve spring 70. Chamber 80 may be provided with a suitable packing, not shown, to prevent leakage of purging gas to the atmosphere. As indicated, the shaft seal surrounds said shaft and is positioned at the opening through which vertical shaft 64 extends.

Figure 9:
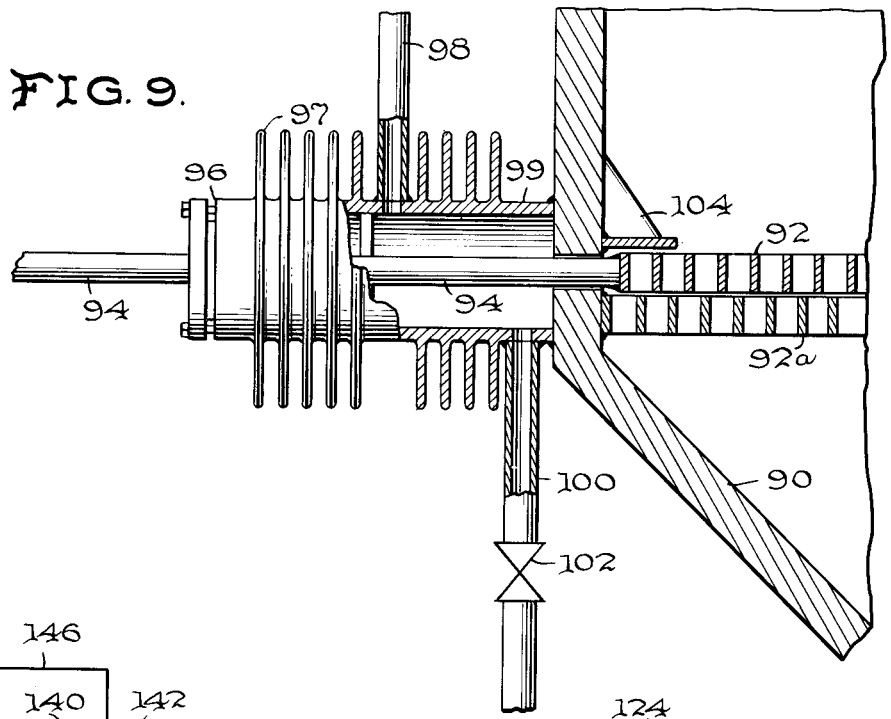

Figure 9 is a fragmentary, vertical section of an apparatus embodying an alternative means for accomplishing the relative movement of the foraminous members described above. In this figure number 90 refers to the vessel shell. Numeral 92 denotes the movable member of a pair of gratings and numeral 92a refers to the fixed member of a pair of gratings. Member 92a is attached to vessel 90 in the manner illustrated. Numeral 94 denotes a shaft fixedly attached to one edge of the movable grating 92. Numeral 104 designates a catalyst shield.

In operation, horizontal movement of shaft 94 operates to move the apertures of grating 92 into or out of register with the apertures of fixed grating 92a, thus achieving a variation in the effective size of the apertures through the pair of gratings. A purging gas is introduced into catalyst trap 99 by way of line 98 under a pressure sufficient to insure positive flow of gas from trap 99 into vessel 90, thus preventing substantial flow of vapors and catalyst into catalyst trap 99. Any catalyst tending to accumulate in catalyst trap 99 may be removed periodically by way of catalyst blow-out line 100. This operation may be accomplished simply by opening valve 102. The flow of purge gas into trap 99 operates to blow accumulated catalyst out of trap 99 into line 100. Cooling fins 97 are provided to dissipate excess heat from seal chamber 99 and from packing gland 96.

Shaft 94 may be driven by a pressure cylinder and piston arrangement such as that illustrated in Figure 8, or alternatively, by the pneumatic motor of a large diaphragm valve, by an electric motor gear drive, or by hand. Conversely, any of the drive means mentioned or equivalent means may be utilized in place of the pressure cylinder and drive means illustrated in Figure 8. The drive mechanisms of Figures 8 and 9 may be actuated either manually or automatically by means of instrument. Also, the concurrent variation in the stripping gas flow and the rate of particle circulation may be effected manually or by instruments. The movable gratings in each group may be adjusted simultaneously or individually, where independent moving mechanisms are provided.

Figure 10:
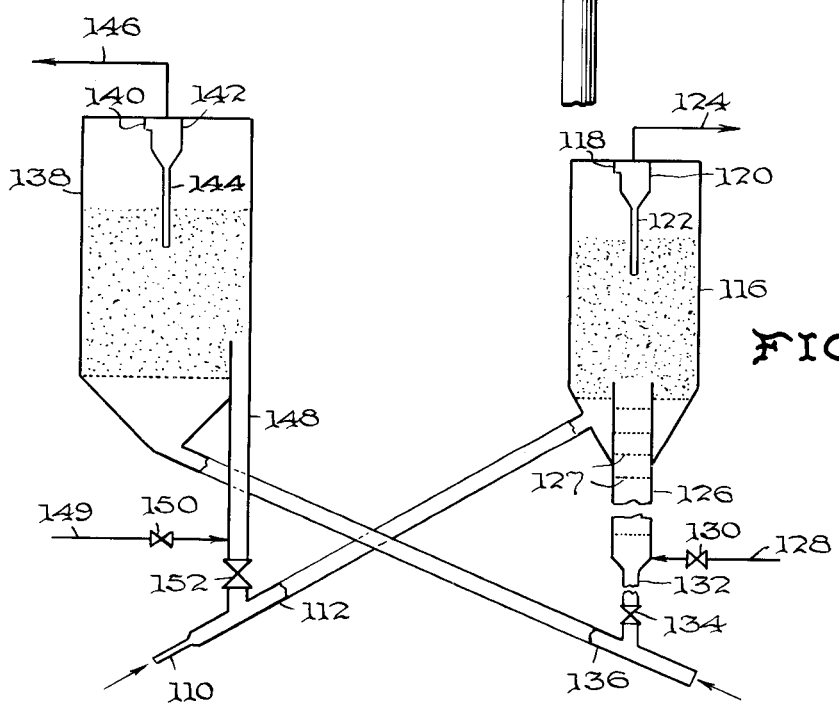
Figure 10 is a flow diagram of one type of operation involving the continuous circulation of particles at varying rates between a regenerating zone and a reaction zone and embodying the principles of the invention.

Referring now to Figure 10 there is shown a flow diagram representaitve of one type of operation in which the invention is suitable. In operation, vaporized oil feed, preheated by means not shown, is introduced into the system by way of line 110 from which it passes into line 112, where it contacts regenerated catalyst particles flowing from regenerator 138 by way of standpipe 148, at a rate controlled by slide valve 152. The suspension of oil vapors and catalyst pass from line 112 into reactor 116, in the lower portion of which a dense phase bed of fluidized catalyst is maintained. Reaction products and a small amount of entrained catalyst pass out of the dilute phase catalyst suspension in the upper portion of reactor 116 through opening 118 in cyclone separator 120. The bulk of entrained catalyst particles are removed from the reaction products in this separator. Substantially catalyst-free reaction products pass overhead to recovery equipment, not shown, by way of line 124. Catalyst particles separated in cyclone separator 120 are returned to the dense phase catalyst bed by way of standpipe 122.

Fouled catalyst particles containing adsorbed materials and entrained gases pass downwardly into stripping chamber 126, through several groups of foraminous members of the type described, which are represented by numeral 127. Stripping gas is passed upwardly through stripping chamber 126 from line 128 at a rate controlled by valve 130. Stripped catalyst passes from the lower portion of stripping chamber 126 into standpipe 132.

The stripped catalyst passes from this standpipe into catalyst transfer conduit 136 at a rate controlled by valve 134. A gaseous stream passing through line 136 and normally comprising air, conveys the stripped catalyst into regenerating vessel 138 which also contains a dense phase fluidized bed of catalyst.

In this vessel contaminants are removed from the catalyst particles by combustion. Flue gases plus a small amount of entrained catalyst pass out of the dilute phase suspension in upper portion of regenerator 138 into cyclone separator 142 by way of opening 140. In this separator the bulk of entrained catalyst particles are separated from the flue gas and returned to the dense phase catalyst bed by way of line 144. Flue gas, substantially free of entrained catalyst, passes out of the vessel by way of line 146.

Regenerated catalyst particles pass downwardly from the dense phase bed in vessel 138 into standpipe 148. The particles in standpipe 148 are maintained in a fluidized condition by means of gas introduced by way of line 149 at a rate controlled by valve 150. This gas also has a stripping effect on the regenerated catalyst.

As the rate of particle circulation from vessel 116 to vessel 138 varies in accordance with fluctuations in the system or in accordance with necessary changes in operating conditions, which variation is achieved by suitable regulation of valve 134, concurrent and approximately directly proportional variations in the size of the apertures in foraminous members 127 and the setting of valve 130 are also effected. In this manner, the desirable results described above are achieved.

The invention is applicable to any operation involving the fluidized conversion of reactant vapors in a reaction zone containing a bed of fluidized particles, wherein said particles are regenerated in a separate regenerating zone, and wherein said particles are circulated at varying rates between the respective zones, and where the particles are stripped following their removal from at least one of the zones and prior to transfer thereof to the other of said zones. Purely by way of example, the invention may be used in connection with stripping particles of catalyst used in the fluidized catalytic cracking, fluidized catalytic reforming, fluidized catalytic hydroforming or the fluidized catalytic hydrogenation of hydrocarbon oils. The invention is also suitable for use in the fluidized catalytic synthesis of hydrocarbons. The invention is not limited to catalytic reactions, but can be used in stripping non-catalytic contact materials such as those employed to transfer heat to a reaction zone. An example of such a reaction is the continuous, fluidized coking of hydrocarbon oils, where coke or other inert particles comprise the fluidized contact material. The specific particles, feeds, reaction conditions, etc. used in the various reactions to which my invention is applicable, need not be discussed in detail, since they form no part of my invention and are well known in the art.

Although the improved stripping of this invention has been shown in connection with stripping of catalyst particles removed from the reactor, it may be used to advantage in connection with the regenerator, if desired.

While the figures illustrated show the foraminous members in groups of two, it will be obvious to one skilled in the art that groups containing more than two members may be employed. It will also be apparent that the size of the apertures in the foraminous members may vary widely. When the total area of the apertures is large as compared to the total area of the walls between these apertures, it may be advantageous to employ more than two foraminous members in each group so that the effective size of the apertures may be varied over a wider range. The foraminous members may comprise screens, gratings, perforated plates, and the like.

Although the invention has been shown for use in connection with certain specific types of integral strippers, it will be apparent to those skilled in the art that the invention is adapted for use with other types of integral strippers as well as for use in conjunction with external strippers.

Among the advantages produced by the invention is the fact that having selected a desired degree of stripping, stripping to this extent may be maintained relatively constant despite variations in the operating conditions of this system. Moreover, this advantage is achieved without interference with the flexibility in the flow rate of particles between the reactor and the regenerator, i. e., the desired degree of stripping is maintained despite the necessary and controlled fluctuation in the flow rate of particles through the stripping zone. By providing alternate dense and dilute phase particulate beds in the stripping zone, maximum effectiveness of contact between stripping gas and particles is achieved. Accordingly, the degree of stripping attained per unit volume of stripping gas is relatively high as compared with systems utilizing unobstructed stripping vessels. The structure provided is such that the bulk of the stripping volume is made up of high density zones of particles, and only a minor portion of the stripping volume comprises low density zones. Thus, a high stripping capacity per unit stripping volume is provided. The foraminous members described additionally prevent the formation of large gas bubbles and the mass turn-over of particles in the stripping zone, which so greatly reduce the effectiveness of many conventional strippers by allowing considerable portions of the gas and particles to pass quickly through the stripper without effective or adequate contact.

What I claim is:

1. In combination, a reaction vessel and a regenerating vessel, each adapted to contain a dense phase bed of fluidized solid particles, means for continuously circulating fluidized solid particles at varying rates from the reaction vessel to the regenerating vessel and back, stripping means adapted to receive fluidized solid particles from at least one of said vessels prior to circulation thereof to the other of said vessels, said stripping means comprising a chamber divided into a plurality of connected, vertically arranged, superposed stripping compartments by horizontally disposed foraminous members mounted transversely across the entire cross-section of the chamber, said foraminous members having a plurality of apertures therethrough that are disposed uniformly over the entire area of the members and that are adapted to permit concurrent downward flow of fluidized solid particles and upward flow of stripping medium directly between vertically adjacent, superposed compartments, the sum of the cross-sectional areas of the apertures in each member being a major portion of the cross-sectional area of the member, each compartment being adapted to contain dense and dilute phase suspensions of particles, means for passing a stripping medium upwardly through said stripping compartments, means for concurrently varying the effective size of the apertures through said foraminous members and the rate of introduction of said stripping medium in approximately direct proportion to variations in the rate of particle circulation between the vessels.

2. In combination, a reaction vessel and a regenerating vessel, each adapted to contain a dense phase bed of fluidized solid particles, means for continuously circulating fluidized solid particles at varying rates from the reaction vessel to the regenerating vessel and back, stripping means adapted to receive fluidized solid particles from the reaction vessel prior to circulation thereof to the regenerating vessel, said stripping means comprising a chamber divided into a plurality of connected, vertically arranged, superposed stripping compartments each adapted to contain dense and dilute phase suspensions of particles, each of said compartments being separated from each other by horizontally disposed foraminous members mounted transversely across the entire cross-section of the chamber, said foraminous members having a plurality of apertures therethrough that are disposed uniformly over the entire area of the members and that are adapted to permit concurrent downward flow of fluidized solid particles and upward flow of stripping medium directly between vertically adjacent, superposed compartments, the sum of the cross-sectional areas of the apertures in each member being a major portion of the cross-sectional area of the member, means for passing a stripping medium upwardly through said stripping compartments, means for concurrently varying the effective size of the apertures through said foraminous members and the rate of introduction of said stripping medium in approximately direct proportion to variations in the particle circulation rate between the vessels.

3. In combination, a reaction vessel and a regenerating vessel each adapted to contain a dense phase bed of fluidized solid particles, a first conduit means for transferring particles from the reaction vessel to the regenerating vessel, a second conduit means for transferring particles from the regenerating vessel to the reaction vessel, valve means for varying the rate of introduction of said particles into said conduit means and thus for varying the rate of circulation of particles between said vessels, a stripping chamber adapted to receive particles from said reaction vessel and adapted to discharge stripped particles into said first conduit means, a plurality of horizontally disposed, transversely arranged groups of foraminous members within said stripping chamber and extending over the entire cross-section thereof, each group of members being spaced vertically apart from the next, the respective members of each group being relatively closely disposed to one another, and the respective groups being relatively remote from one another, said foraminous members having a plurality of apertures therethrough that are disposed uniformly over the entire area of said members and that are adapted to permit concurrent downward flow of fluidized solid particles and upward flow of stripping medium directly between vertically adjacent, superposed compartments, the sum of the cross-sectional areas of the apertures in each member being a major portion of the cross-sectional area of the member, means for moving at least one member of each group of members relative to another member of said group to vary the total effective area of the apertures through each group of members, means for passing a stripping medium upwardly through said stripping chamber, means for varying the rate of introduction of the stripping medium, means for introducing reactant vapor into the reaction vessel, means for withdrawing reaction products therefrom, means for introducing regenerating gas into the regenerator and means for removing flue gas therefrom.

4. In combination, a reaction vessel and a regenerating vessel, each adapted to contain a dense phase bed of fluidized solid particles, a first conduit means for transferring particles from the reaction vessel to the regenerating vessel, a second conduit means for transferring particles from the regenerating vessel to the reaction vessel, valve means for varying the rate of introduction of said particles into said conduit means and thus for varying the rate of circulation of particles between said vessels, a stripping chamber adapted to receive particles from said reaction vessel and adapted to discharge stripped particles into said first conduit means, a plurality of horizontally disposed, transversely arranged pairs of foraminous members within said stripping chamber and extending over the entire cross-section thereof, each pair of members being spaced vertically apart from the next, the respective members of each pair being relatively closely disposed to one another, and the respective pairs being relatively remote from one another, said foraminous members having a plurality of apertures therethrough that are disposed uniformly over the entire area of said members and that are adapted to permit concurrent downward flow of fluidized solid particles and upward flow of stripping medium directly between vertically adjacent, superposed compartments, the sum of the cross-sectional areas of the apertures in each member being a major portion of the cross-sectional area of the member, means for moving at least one member of each pair of members relative to the other member of said pair to vary the total effective area of the apertures through each pair of members, means for passing a stripping medium upwardly through said stripping chamber, means for varying the rate of introduction of the stripping medium, means for introducing reactant vapor into the reaction vessel, means for removing reaction products therefrom, means for introducing regenerating gas into the regenerator and means for removing flue gas therefrom.

5. In combination, a reaction vessel and a regenerating vessel, each adapted to contain a dense phase bed of fluidized solid particles, a first conduit means for transferring particles from the reaction vessel to the regenerating vessel, a second conduit means for transferring particles from the regenerating vessel to the reaction vessel, valve means for varying the rate of introduction of said particles into said conduit means and thus for varying the rate of circulation of particles between said vessels, a stripping chamber adapted to receive particles from said reaction vessel and adapted to discharge stripped particles into said first conduit means, a plurality of horizontally disposed, transversely arranged pairs of foraminous members within said stripping chamber and extending over the entire cross-section thereof, each pair of members being spaced vertically apart from the next, the respective members of each pair being relatively closely disposed to one another and the respective pairs being relatively remote from one another, said foraminous members having a plurality of apertures therethrough that are disposed uniformly over the entire area of said members and that are adapted to permit concurrent downward flow of fluidized solid particles and upward flow of stripping medium directly between vertically adjacent, superposed compartments, the sum of the cross-sectional areas of the apertures in each member being a major portion of the cross-sectional area of the member, and the apertures through one member in each pair being offset from the apertures in the other member of said pair, means for moving at least one member of each pair vertically relative to the other to vary the total effective area of the apertures through each pair of members, means for passing a stripping medium upwardly through said stripping chamber, means for varying the rate of introduction of the stripping medium, means for introducing reactant vapor into the reaction vessel, means for removing reaction products therefrom, means for introducing regenerating gas into the regenerator and means for removing flue gas therefrom.

6. In combination, a reaction vessel and a regenerating vessel, each adapted to contain a dense phase bed of fluidized solid particles, a first conduit means for transferring particles from the reaction vessel to the regenerating vessel, a second conduit means for transferring particles from the regenerating vessel to the reaction vessel, valve means for varying the rate of introduction of said particles into said conduit means and thus for varying the rate of circulation of particles between said vessels, a stripping chamber adapted to receive particles from said reaction vessel and adapted to discharge stripped particles into said first conduit means, a plurality of horizontally disposed, transversely arranged pairs of foraminous members within said stripping chamber and extending over the entire cross-section thereof, each pair of members being spaced vertically apart from the next, the respective members of each of said pairs being relatively closely disposed to one another, each of said pairs being relatively remote from one another, said foraminous members having a plurality of apertures therethrough that are disposed uniformly over the entire area of said members and that are adapted to permit concurrent downward flow of fluidized solid particles and upward flow of stripping medium directly between vertically adjacent, superposed compartments, the sum of the cross-sectional areas of the apertures in each member being a major portion of the cross-sectional area of the member, and the apertures through one member in each pair being offset from the apertures in the other member of said pair, means for moving at least one member of each of said pairs vertically relative to the other to vary the total effective area of the apertures through each pair of members, said means comprising a vertical shaft passing through the pairs of foraminous members and attached to each movable member and extending through an opening in the bottom of the chamber, a shaft seal position at this opening and surrounding said shaft to prevent leakage of gas and particles through said opening, said shaft seal comprising a first hollow cylindrical member mounted within said chamber coaxially about said shaft and attached at its lower end to the interior surface of the bottom of the chamber, a second cylindrical member of slightly greater diameter than the first and having an open lower end, said second cylindrical member being mounted within said chamber coaxially about said shaft and attached thereto so as to permit movement with said shaft and internesting engagement thereof with said first cylindrical member throughout the extent of vertical travel of said shaft, a gas conduit connected to a source of inert gas that is at a pressure sufficient to provide a positive gas flow into said chamber, said gas conduit being adapted to discharge inert gas into the interior of said first cylindrical member, a packing chamber surrounding said vertical shaft exteriorly of said chamber and attached to the exterior surface of said chamber and adapted to form a seal against gas leakage from the interior of said first cylindrical member to the exterior of said chamber, means for moving said shaft and attached members vertically, means for passing stripping gas upwardly through said stripping chamber, means for varying the rate of introduction of the stripping medium, means for introducing reactant vapor into the reaction vessel, means for removing reaction products therefrom, means for introducing regenerating gas into the regenerating vessel and means for removing flue gas therefrom.

7. In combination, a reaction vessel and a regenerating vessel, each adapted to contain a dense phase bed of fluidized solid particles, a first conduit means for transferring particles from the reaction vessel to the regenerating vessel, a second conduit means for transferring particles from the regenerating vessel to the reaction vessel, valve means for varying the rate of introduction of said particles into said conduit means and thus for varying the rate of circulation of particles between said vessels, a stripping chamber adapted to receive particles from said reaction vessel and adapted to discharge stripped particles into said first conduit means, a plurality of horizontally disposed, transversely arranged pairs of foraminous members within said stripping chamber and extending over the entire cross-section thereof, each group of members being spaced vertically apart from the next, the respective members of each group being contiguous to one another, said foraminous members having a plurality of apertures therethrough that are disposed uniformly over the entire area of said members and that are adapted to permit concurrent downward flow of fluidized solid particles and upward flow of stripping medium directly between vertically adjacent, superposed compartments, the sum of the cross-sectional areas of the apertures in each member being a major portion of the cross-sectional area of the member, means for moving at least one member of each of said groups horizontally relative to another member of each group to vary the total effective area of the apertures through each group of members, means for passing stripping medium upwardly through the stripping chamber, means for varying the rate of introduction of the stripping medium, means for introducing reactant vapor into the reaction vessel, means for removing converted products therefrom, means for introducing regenerating gas into the regenerating vessel and means for removing flue gas therefrom.

8. In combination, a reaction vessel and a regenerating vessel, each adapted to contain a dense phase bed of fluidized solid particles, a first conduit means for transferring particles from the reaction vessel to the regenerating vessel, a second conduit means for transferring particles from the regenerating vessel to the reaction vessel, valve means for varying the rate of introduction of said particles into said conduit means and thus for varying the rate of circulation of particles between said vessels, a stripping chamber adapted to receive particles from said reaction vessel and adapted to discharge stripped particles into said first conduit means, a plurality of horizontally disposed, transversely arranged pairs of foraminous members within said stripping chamber and extending over the entire cross-section thereof, each pair of members being spaced vertically apart from the next, the respective members of said pairs being contiguous to one another, said foraminous members having a plurality of apertures therethrough that are disposed uniformly over the entire area of said members and that are adapted to permit concurrent downward flow of fluidized solid particles and upward flow of stripping medium directly between vertically adjacent, superposed compartments, the sum of the cross-sectional areas of the apertures in each member being a major portion of the cross-sectional area of the member, means for moving at least one member of each of said pairs horizontally to vary the total effective area of the openings through each pair of members, said means comprising a plurality of shafts corresponding to the number of movable members, each shaft being attached to a movable member and extending horizontally through an opening in the stripping chamber, a shaft seal positioned at said openings and surrounding said shafts to prevent leakage of vapor and particles through said openings, each of said shaft seals comprising a hollow cylinder mounted axially about the shaft exteriorly of said chamber and attached to the outer surface of said chamber, said cylinder being provided with a plurality of cooling fins, a packing gland in association with said cylinder and surrounding said shaft, said packing gland being adapted to prevent gas leakage from the interior to the exterior of the cylinder, a gas conduit connected to a source of inert gas that is at a pressure sufficient to provide a positive gas flow into said chamber, said gas conduit being adapted to discharge into the cylinder, a blowout conduit having its inlet end connected to the cylinder in a position relatively remote from the discharge end of said gas conduit, a valve in said blowout conduit adapted to control flow therethrough, said blowout conduit being adapted, when the valve is open, to receive the flow from said gas conduit, means for moving the shafts and attached movable members horizontally, means for passing stripping gas upwardly through said stripping medium, means for varying the rate of introduction of the stripping medium, means for introducing reactant vapor into the reaction vessel, means for removing converted products therefrom, means for introducing regenerating gas into the regenerating vessel and means for removing flue gas therefrom.

References Cited in the file of this patent

UNITED STATES PATENTS

| | | |
|---|---|---|
| 1,196,979 | Randolph | Sept. 5, 1916 |
| 2,421,616 | Hemminger et al. | June 3, 1947 |
| 2,510,444 | Watson | June 6, 1950 |
| 2,513,369 | Shaw | July 4, 1950 |
| 2,556,301 | Squires | June 12, 1951 |
| 2,587,554 | Weikart | Feb. 26, 1952 |